United States Patent [19]
Keller et al.

[11] Patent Number: 6,167,492
[45] Date of Patent: Dec. 26, 2000

[54] CIRCUIT AND METHOD FOR MAINTAINING ORDER OF MEMORY ACCESS REQUESTS INITIATED BY DEVICES COUPLED TO A MULTIPROCESSOR SYSTEM

[75] Inventors: James B. Keller, Palo Alto, Calif.; Dale E. Gulick, Austin, Tex.; Larry D. Hewitt, Austin, Tex.; Geoffrey Strongin, Austin, Tex.

[73] Assignee: Advanced Micro Devices, Inc., Sunnyvale, Calif.

[21] Appl. No.: 09/220,487

[22] Filed: Dec. 23, 1998

[51] Int. Cl.$^7$ .............................. G06F 13/00; G06F 12/00
[52] U.S. Cl. .......................... 711/154; 709/200; 709/238; 711/217
[58] Field of Search ..................................... 711/154, 152, 711/141, 217; 709/200, 240, 238, 253; 710/5

[56] References Cited

U.S. PATENT DOCUMENTS

| | | | |
|---|---|---|---|
| 5,530,933 | 6/1996 | Frink et al. | 711/141 |
| 5,835,742 | 11/1998 | James et al. | 710/130 |
| 5,864,738 | 1/1999 | Kessler et al. | 709/239 |
| 5,930,822 | 7/1999 | Chaney et al. | 711/150 |
| 5,983,326 | 11/1999 | Hagersten et al. | 711/147 |
| 6,094,686 | 7/2000 | Sharma | 709/240 |

OTHER PUBLICATIONS

Linley Gwennap, "Alpha 21364 to Ease Memory Bottleneck," Microprocessor Report—The Insider's Guide to Microprocessor Hardware, vol. 12, No. 14, Oct. 26, 1998, pp. 12–15.

*Primary Examiner*—Do Hyun Yoo
*Assistant Examiner*—Hong Kim
*Attorney, Agent, or Firm*—Conley, Rose & Tayon, PC.; B. Noël Kivlin

[57] ABSTRACT

A circuit and method is disclosed for preserving the order for memory requests originating from I/O devices coupled to a multiprocessor computer system. The multiprocessor computer system includes a plurality of circuit nodes and a plurality of memories. Each circuit node includes at least one microprocessor coupled to a memory controller which in turn is coupled to one of the plurality of memories. The circuit nodes are in data communication with each other, each circuit node being uniquely identified by a node number. At least one of the circuit nodes is coupled to an I/O bridge which in turn is coupled directly or indirectly to one or more I/O devices. The I/O bridge generates non-coherent memory access transactions in response to memory access requests originating with one of the I/O devices. The circuit node coupled to the I/O bridge, receives the non-coherent memory access transactions. For example, the circuit node coupled to the I/O bridge receives first and second non-coherent memory access transactions. The first and second non-coherent memory access transactions include first and second memory addresses, respectively. The first and second non-coherent memory access transactions further include first and second pipe identifications, respectively. The node circuit maps the first and second memory addresses to first and second node numbers, respectively. The first and second pipe identifications are compared. If the first and second pipe identifications compare equally, then the first and second node numbers are compared. First and second coherent memory access transactions are generated by the node coupled to the I/O bridge wherein the first and second coherent memory access transactions correspond to the first and second non-coherent memory access transactions, respectively. The first coherent memory access transaction is transmitted to one of the nodes of the multiprocessor computer system. However, the second coherent memory access transaction is not transmitted unless the first and second pipe identifications do not compare equally or if the first and second node numbers compare equally.

18 Claims, 9 Drawing Sheets

| Bit Time | 7 | 6 | 5 | 4 | 3 | 2 | 1 | 0 |
|---|---|---|---|---|---|---|---|---|
| 1 | | | CMD[5:0] | | | | | |
| 2 | | | | | | | | |

FIG. 3

| Bit Time | 7 | 6 | 5 | 4 | 3 | 2 | 1 | 0 |
|---|---|---|---|---|---|---|---|---|
| 1 | DestNode[1:0] | | CMD[5:0] | | | | | |
| 2 | SrcTag[1:0] | | SrcNode[3:0] | | | | DestNode[3:2] | |
| 3 | | | | SrcTag[6:2] | | | | |
| 4 | Addr[7:0] | | | | | | | |
| 5 | Addr[15:8] | | | | | | | |
| 6 | Addr[23:16] | | | | | | | |
| 7 | Addr[31:24] | | | | | | | |
| 8 | Addr[39:32] | | | | | | | |

FIG. 4

| Bit Time | 7 | 6 | 5 | 4 | 3 | 2 | 1 | 0 |
|---|---|---|---|---|---|---|---|---|
| 1 | DestNode[1:0] | | CMD[5:0] | | | | | |
| 2 | SrcTag[1:0] | | SrcNode[3:0] | | | | DestNode[3:2] | |
| 3 | | | | SrcTag[6:2] | | | | |
| 4 | | | | | | | | |

FIG. 5

| Bit Time | 7 | 6 | 5 | 4 | 3 | 2 | 1 | 0 |
|---|---|---|---|---|---|---|---|---|
| 1 | Data[7:0] | | | | | | | |
| 2 | Data[15:8] | | | | | | | |
| 3 | Data[23:16] | | | | | | | |
| 4 | Data[31:24] | | | | | | | |
| 5 | Data[39:32] | | | | | | | |
| 6 | Data[47:40] | | | | | | | |
| 7 | Data[55:48] | | | | | | | |
| 8 | Data[63:56] | | | | | | | |

FIG. 6

| Bit Time | 7 | 6 | 5 | 4 | 3 | 2 | 1 | 0 |
|---|---|---|---|---|---|---|---|---|
| 1 | | | Cmd[5:0] | | | | | |
| 2 | | | | | | | | |

| Bit Time | 7 | 6 | 5 | 4 | 3 | 2 | 1 | 0 |
|---|---|---|---|---|---|---|---|---|
| 1 | | | Cmd[5:0] | | | | | |
| 2 | | | | PipeID[4:0] | | | | |
| 3 | | | | SrcTag[4:0] | | | | |
| 4 | Addr[7:0] | | | | | | | |
| 5 | Addr[15:8] | | | | | | | |
| 6 | Addr[23:16] | | | | | | | |
| 7 | Addr[31:24] | | | | | | | |
| 8 | Addr[39:32] | | | | | | | |

| Bit Time | 7 | 6 | 5 | 4 | 3 | 2 | 1 | 0 |
|---|---|---|---|---|---|---|---|---|
| 1 | | | Cmd[5:0] | | | | | |
| 2 | | | | PipeID[4:0] | | | | |
| 3 | Count | | | SrcTag | | | | |
| 4 | Rsv | | | | | | | |

| Bit Time | 7 | 6 | 5 | 4 | 3 | 2 | 1 | 0 |
|---|---|---|---|---|---|---|---|---|
| 1 | Data[7:0] | | | | | | | |
| 2 | Data[15:8] | | | | | | | |
| 3 | Data[23:16] | | | | | | | |
| 4 | Data[31:24] | | | | | | | |
| 5 | Data[39:32] | | | | | | | |
| 6 | Data[47:40] | | | | | | | |
| 7 | Data[55:48] | | | | | | | |
| 8 | Data[63:56] | | | | | | | |

| CMD Code | Command | Packet Type |
|---|---|---|
| 000000 | Nop | Info |
| 000001 | Reserved | - |
| 000010 | BufRelease | Info |
| 000011 | BufReleaseHi | Info |
| 000100 | Interrupt | |
| 000101 | Reserved | - |
| 00011x | Reserved | - |
| 001000 | Probe/Src | Address |
| 001001 | Probe/Tgt | Address |
| 00101x | Reserved | - |
| 0011xx | Reserved | - |
| 0100xx | ReadSized | Address |
| 0110xx | ReadSized | Address |
| 011100 | RdBlk | Address |
| 011101 | RdBlkMod | Address |
| 011110 | ChangetoDirty | Address |
| 011111 | ValidateBlk | Address |
| 1000xx | WrSized | Address |
| 1010xx | WrSized | Address |
| 101100 | VicBlk | Address |
| 101101 | Reserved | - |
| 10111x | Reserved | - |
| 11000x | RdResponse | Response |
| 11001x | ProbeResp | Response |
| 110100 | IntrResponse | Response |
| 110101 | Reserved | - |
| 11011x | Reserved | - |
| 1110xx | Reserved | - |
| 111100 | SrcDone | Response |
| 111101 | MemCancel | Response |
| 111110 | TgtDone | Response |
| 111111 | Error | Info |

FIG. 13

CIRCUIT AND METHOD FOR MAINTAINING ORDER OF MEMORY ACCESS REQUESTS INITIATED BY DEVICES COUPLED TO A MULTIPROCESSOR SYSTEM

BACKGROUND OF THE INVENTION

1. Field of the Invention

The present invention relates to the field of computer systems, and more particularly to a multiprocessor computer system having an input/output bridge coupled to devices external to the multiprocessor computer system.

2. Description of the Relevant Art

Personal computers (PCs) and other types of computer systems have been designed around a shared bus system for accessing memory. One or more processors and one or more input/output (I/O) devices may be coupled to the memory through the shared bus. The I/O devices may be coupled to the shared bus through an I/O bridge which manages the transfer of information between the shared bus and the I/O devices, while processors are typically coupled directly to the shared bus or coupled through a cache hierarchy to the shared bus.

Unfortunately, shared bus systems suffer from several drawbacks. For example, since there are multiple devices attached to the shared bus, the bus is typically operated at a relatively low frequency. The multiple attachments present a high capacitive load to a device driving a signal on the bus, and the multiple attach points present a relatively complicated transmission line model for high frequencies. Accordingly, the frequency remains low, and the bandwidth available of the shared bus is similarly relatively low. A low bandwidth presents a barrier to attaching additional devices to the shared bus, as performance may be limited by available bandwidth.

Another disadvantage of the shared bus system is a lack of scalability to larger numbers of devices. As mentioned above, the amount of bandwidth is fixed and may decrease if additional devices are added. Once the bandwidth requirements of the devices attached to the bus, either directly or indirectly, exceeds the available bandwidth of the bus, devices will frequently be stalled when attempting to access the bus. As a result, overall performance may be decreased.

One or more of the above problems may be addressed using a distributed memory system. A computer system employing a distributed memory system includes multiple nodes. Two or more of these nodes are connected to individual memories, respectively, and the nodes are interconnected using any suitable interconnect. For example, each node may be connected to each other node using dedicated lines. Alternatively, each node may connect to a fixed number of other nodes, and transactions between nodes may be routed from a first node to a second node to which the first node is not directly connected via one or more intervening nodes. A memory address space is assigned across the memories in each node.

Nodes may additionally include a processor. The processor typically includes a cache which stores cache blocks of data read from the memories. Furthermore, a node may include one or more caches external to the processors. Since the processors and/or nodes may be storing cache blocks accessed by other nodes, it is desirable to maintain coherency within the nodes.

SUMMARY OF THE INVENTION

The present invention provides a method and circuit for maintaining order of memory requests initiated by I/O devices coupled directly or indirectly to a multiprocessor computer system via an I/O bridge. In one embodiment, the multiprocessor computer system comprises a plurality of processing nodes and a plurality of memories. Each processing node includes at least one microprocessor coupled to a memory controller which, in turn, is coupled to one of the plurality of memories. Each memory defines a portion of the memory address space for the computer system. Each processing node is uniquely identified by a node number. The I/O bridge is coupled to one or more processing nodes and is configured to generate and transmit a non-coherent memory access transaction. The non-coherent memory access transaction is generated in response to a memory access request generated by an I/O device coupled directly or indirectly to the I/O bridge. The I/O bridge transmits the non-coherent memory access transaction to at least one processing node connected thereto where it is transformed into a coherent memory access transaction for transmission to another processing node within the multiprocessor computer system. Each non-coherent memory transaction includes at least one command packet containing a pipe identification and a memory address affected by the memory access transaction. The pipe identification may include information identifying the origin of the memory request. Generally, non-coherent memory transactions having the same pipe identification must complete in order whereas non-coherent memory transactions having different pipe identifications may complete out of order.

The I/O bridge generates first and second non-coherent memory access transactions, the second non-coherent memory access transactions being generated after the first non-coherent memory access transaction. Each of the first and second non-coherent memory access transactions include first and second memory addresses, respectively. Further, each of the first and second non-coherent memory access transactions include first and second pipe identifications, respectively. The first and second memory addresses are mapped to first and second node numbers, respectively, in response to the connected node receiving the first and second non-coherent memory access transactions. Thereafter, the first and second pipe identifications of the received first and second non-coherent memory access transactions, are compared. Additionally, the first and second node numbers are compared if the first and second pipe identifications compare equally. The connected node which receives the first and second non-coherent memory transactions generates and transmits a first coherent memory access transaction corresponding to the first non-coherent memory transaction. This first coherent memory access transaction includes the mapped first node number and the first memory address. The processing node also generates a second coherent memory access transaction corresponding to the second non-coherent memory access transaction. This second coherent memory access transaction includes the second node number and the second memory address. However, in one embodiment, the second coherent memory access transaction is generated only if the first and second pipe identifications do not compare equally or if the first and second node numbers compare equally. In another embodiment, the second coherent memory access translation is generated without delay upon the node circuits receipt of the second non-coherent memory access transaction. However, the second coherent memory access transaction is transmitted from the connected node processing only if the first and second pipe identifications do not compare equally or if the first and second node numbers compare equally.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawing and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Figure 1:
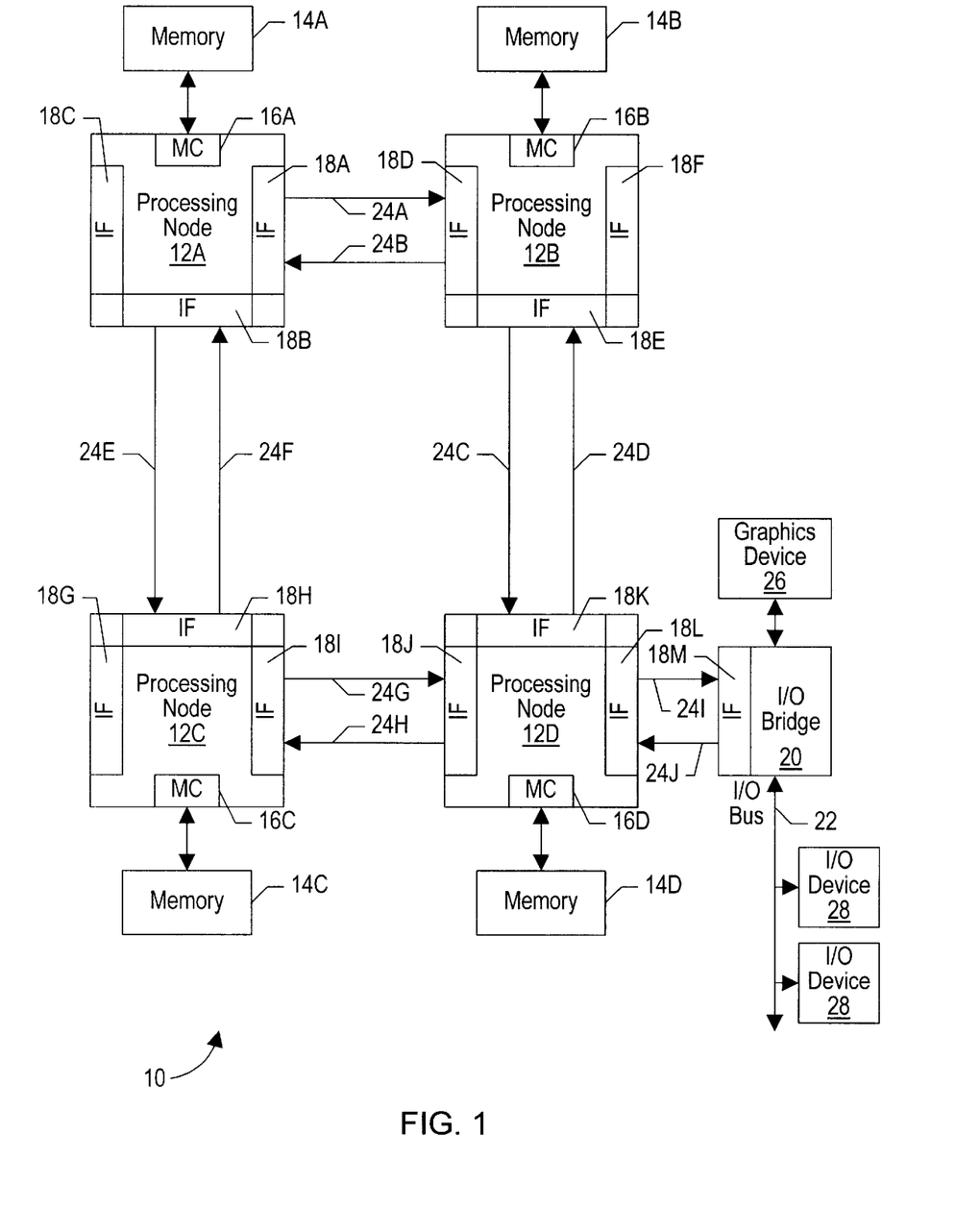
FIG. 1 is a block diagram of one embodiment of a multiprocessor computer system.

Turning now to FIG. 1, one embodiment of a computer system 10 is shown. Other embodiments are possible and contemplated. In the embodiment of FIG. 1, computer system 10 includes several processing nodes 12A, 12B, 12C, and 12D. Processing nodes 12A–12D may include a memory controller 16A–16D, respectively, coupled to a memory 14A–14D, respectively. Additionally, processing nodes 12A–12D may include interface logic used to communicate between the processing nodes 12A–12D. For example, processing node 12A may include interface logic 18A for communicating with processing node 12B, interface logic 18B for communicating with processing node 12C, and interface logic 18C for communicating with yet another processing node (not shown). Similarly, processing node 12B may include interface logic 18D, 18E, and 18F; processing node 12C may include interface logic 18G, 18H, and 18I; and processing node 12D may include interface logic 18J, 18K, and 18L.

Processing node 12D is shown coupled to communicate with an I/O bridge circuit 20 (I/O bridge 20) via interface logic 18L and 18M, with interface logic 18M included in I/O bridge 20. Other processing nodes of FIG. 1 may communicate with other I/O bridges in a similar fashion. FIG. 1 shows I/O bridge 20 in communication only with processing node 12D. Although not shown in FIG. 1, it is to be noted that I/O bridge 20 may be coupled to an additional processing node. Moreover, FIG. 1. shows just one I/O bridge coupled to processing node 12D. However, several I/O bridges could be coupled to processing node 12D in series or parallel.

I/O bridge 20 may be coupled to an I/O bus 22 and a graphics device 26 as shown in FIG. 1. Although not shown in FIG. 1, I/O bridge 20 may also be connected to another I/O bus. I/O bus 22 is shown coupled to several I/O devices 28 one of which may be a secondary I/O bridge coupled to a secondary I/O bus.

Processing nodes 12A–12D may implement a packet-based inter-node communication, i.e., communication between nodes. Inter-node communication may occur through coherent transactions of one or more packets. Transaction packets transmitted between processing nodes will often be referred to as coherent packets. Processing nodes 12A–12D, if coupled to an I/O bridge, may implement a packet-based intra-node communication, i.e., communication between a node and an I/O bridge. Intra-node communication occurs through non-coherent transactions of one or more packets. Transaction packets transmitted between a processing node and an I/O bridge will often be referred to as non-coherent packets.

In the present embodiment, the links between nodes or between a node and an I/O bridge may be implemented as sets of unidirectional lines (e.g. lines 24A are used to transmit coherent packets from processing node 12A to processing node 12B and lines 24B are used to transmit coherent packets from processing node 12B to processing node 12A). Other sets of lines 24C–24J may be used to transmit packets between processing nodes or between a processing node and an I/O bridge as illustrated in FIG. 1. The links may be operated either in a cache coherent fashion for communication between processing nodes or in a non-coherent fashion for communication between a processing node and an I/O bridge. The link between nodes will often be referred to as a coherent link whereas the link between a node and an I/O bridge will often be referred to as a non-coherent link.

It is noted that a coherent packet to be transmitted from one processing node to another may pass through one or more intermediate processing nodes. For example, a coherent packet transmitted by processing node 12A to processing node 12D may pass through either processing node 12B or processing node 12C of FIG. 1. Any suitable routing algorithm may be used. Other embodiments of computer system 10 may include more or fewer processing nodes and I/O bridges then the embodiment shown in FIG. 1.

Processing nodes 12A–12D, in addition to a memory controller and interface logic, may include one or more processors. Broadly speaking, a processing node comprises at least one processor and may optionally include a memory controller for communicating with a memory and other logic as desired. Additionally, a processing node may include a host bridge circuit (host bridge) coupled to at least one I/O bridge via a non-coherent link for transforming non-coherent transactions into coherent transactions, and vice versa.

Memories 14A–14D may comprise any suitable memory device. Memories 14A–14D may comprise one or more RAMBUS DRAMs (RDRAMs), synchronous DRAMs (SDRAMs), static RAMs, etc. The address space of computer system 10 may be divided among memories 14A–14D. Each processing node 12A–12D may include a memory map for determining which addresses are mapped to which memories 14A–14D, and hence to which processing node 12A–12D a memory access transaction for a particular address should be routed. In one embodiment, the coherency point for an address within computer system 10 may be the memory controller 16A–16D coupled to the memory storing bytes corresponding to the address. In other words, the memory controllers 16A–16D may be responsible for ensuring that each memory access to corresponding memories 14A–14D occurs in a cache coherent fashion. Memory controllers 16A–16D may comprise control circuitry for interfacing to memories 14A–14D. Additionally, memory controllers 16A–16D may include request queues for queuing memory access transactions.

Generally, interface logic 18A–18M may comprise a variety of buffers for receiving packets and for buffering packets to be transmitted. Computer system 10 may employ any suitable flow control mechanism for transmitting packets. For example, in one embodiment, each interface logic 18 may store a count of the number of each type of buffer within the receiver at the other end of the link to which that interface logic is connected. The interface logic does not transmit a packet unless the receiving interface logic has a free buffer to store the packet. As a receiving buffer is freed by routing a packet onward, the receiving interface logic transmits a message to the sending interface logic to indicate that the buffer has been freed. Such a mechanism may be referred to as a "coupon-based" system.

Figure 2A:
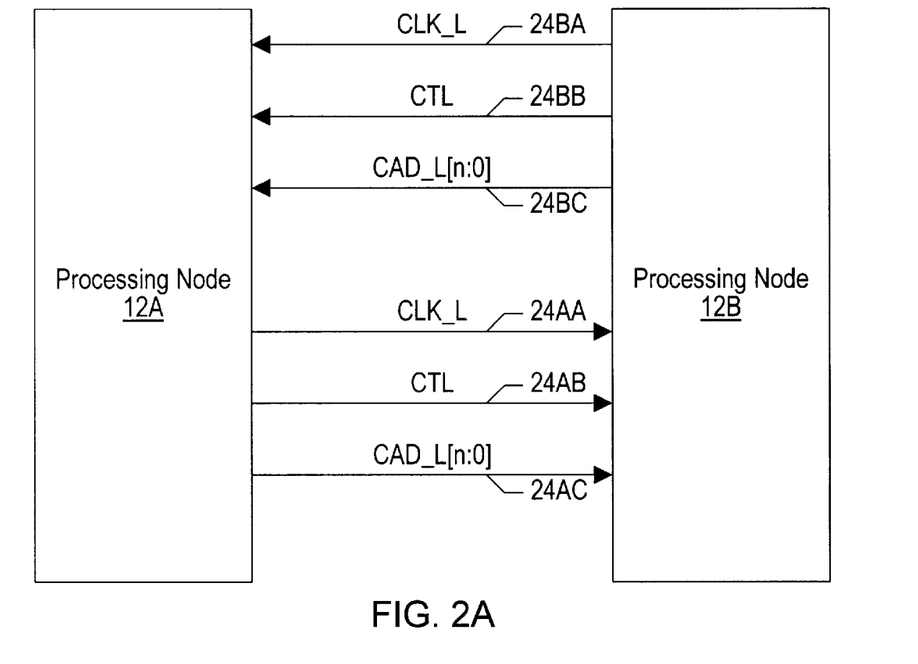
FIG. 2A is a block diagram of a pair of processing nodes shown in FIG. 1.

Turning next to FIG. 2A, a block diagram with processing nodes 12A and 12B is shown to illustrate one embodiment of the coherent link between nodes in more detail. Other embodiments are possible and contemplated. In the embodiment of FIG. 2A, lines 24A may include a clock line 24AA, a control line 24AB, and a control/address/data bus 24AC. Similarly, lines 24B may include a clock line 24BA, a control line 24BB, and a control/address/data bus 24BC.

The clock line of the coherent link may transmit a clock signal that indicates a sample point for the control line and the control/address/data bus. In one particular embodiment, data/control bits may be transmitted on each edge (i.e. rising edge and falling edge) of the clock signal. Accordingly, two data bits per line may be transmitted per clock cycle. The amount of time employed to transmit one bit per line is referred to herein as a "bit time". The above-mentioned embodiment includes two bit times per clock cycle. A coherent packet may be transmitted across two or more bit times. Multiple clock lines may be used depending upon the width of the control/address/data bus. For example, two clock lines may be used for a 32 bit control/address/data bus (with one half of the control/address/data bus referenced to one of the clock lines and the other half of the control/address/data bus and the control line referenced to the other one of the clock lines.

The control line may indicate whether or not the data transmitted upon the control/address/data bus is either a bit time of a coherent control packet or a bit time of a coherent data packet. The control line, in one embodiment, may be asserted to indicate a coherent control packet, and deasserted to indicate a coherent data packet. Certain coherent control packets may indicate that a coherent data packet follows. The coherent data packet may immediately follow the corresponding coherent control packet. In one embodiment, other coherent control packets may interrupt the transmission of a coherent data packet. Such an interruption may be performed by asserting the control line for a number of bit times during transmission of the coherent data packet and transmitting the bit times of the coherent control packet while the control line is asserted. Coherent control packets which interrupt a coherent data packet may not indicate that a coherent data packet will be following.

The control/address/data bus comprises a set of lines for transmitting data/control bits. In one embodiment, the control/address/data bus may comprise 8, 16, or 32 lines. Each coherent link may employ any one of the supported numbers of lines according to design choice. Other embodiments may support other sizes of control/address/data bus as desired.

According to one embodiment, the command/address/data bus lines and the clock line may carry inverted data (i.e. a logical one is represented as a low voltage on the line, and a logical zero is represented as a high voltage). Alternatively, lines may carry non-inverted data (in which a logical one is represented as a high voltage on the line, and logical zero is represented as a low voltage).

Figure 2B:
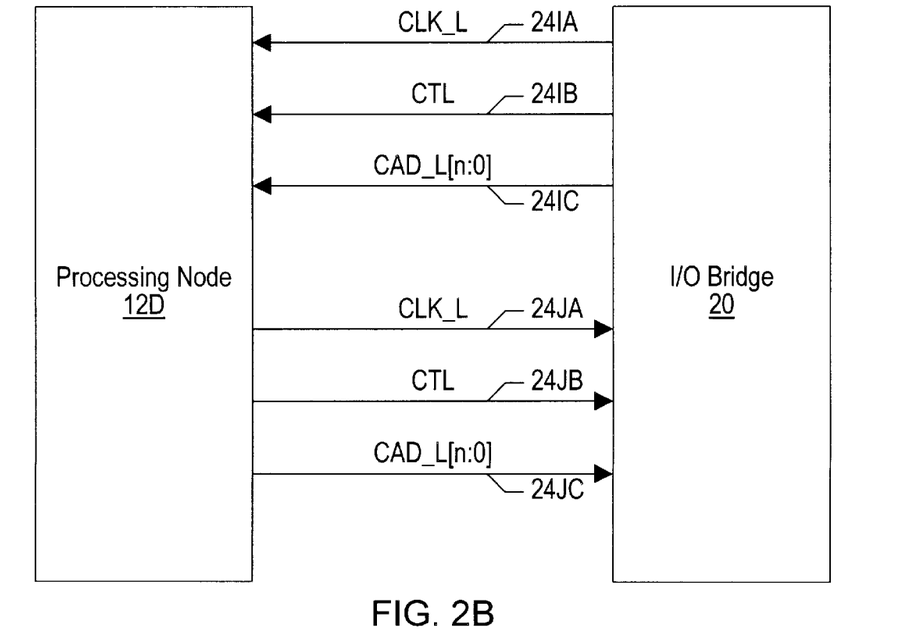
FIG. 2B is a block diagram showing a processing node coupled to an I/O bridge.

Turning next to FIG. 2B, a block diagram with processing node 12D and I/O bridge 20 is shown to illustrate one embodiment of the non-coherent link between a node and I/O bridge in more detail. Other embodiments are possible and contemplated. In the embodiment of FIG. 2B, lines 24I may include a clock line 24IA, a control line 24IB, and a control/address/data bus 24IC. Similarly, lines 24J may include a clock line 24JA, a control line 24JB, and a control/address/data bus 24JC.

Similar to the coherent link, the clock line in the non-coherent link between a node and an I/O bridge may transmit a clock signal that indicates a sample point for the control line and the control/address/data bus. In one particular embodiment, data/control bits may be transmitted on each edge (i.e. rising edge and falling edge) of the clock signal. Accordingly, two data bits per line may be transmitted per clock cycle in the non-coherent link. The amount of time employed to transmit one bit per line is referred to herein as a "bit time". The above-mentioned embodiment may include two bit times per clock cycle. A non-coherent packet may be transmitted across two or more bit times. Multiple clock lines may be used depending upon the width of the control/address/data bus. For example, two clock lines may be used for a 32 bit control/address/data bus (with one half of the control/address/data bus referenced to one of the clock lines and the other half of the control/address/data bus and the control line referenced to the other one of the clock lines.

The control line may indicate whether or not the data transmitted upon the control/address/data bus is either a bit time of a non-coherent control packet or a bit time of a non-coherent data packet. The control line, in one embodiment, may be asserted to indicate a non-coherent control packet, and deasserted to indicate a non-coherent data packet. Certain non-coherent control packets may indicate that a non-coherent data packet follows. The non-coherent data packet may immediately follow the corresponding non-coherent control packet. In one embodiment, other non-coherent control packets may interrupt the transmission of a non-coherent data packet. Such an interruption may be performed by asserting the control line for a number of bit times during transmission of the non-coherent data packet and transmitting the bit times of the non-coherent control packet while the control line is asserted. Non-coherent control packets which interrupt a non-coherent data packet may not indicate that a non-coherent data packet will be following.

The control/address/data bus comprises a set of lines for transmitting the data/control bits. In one embodiment, the control/address/data bus may comprise 8, 16, or 32 lines.

Each non-coherent link may employ any one of the supported numbers of lines according to design choice. Other embodiments may support other sizes of control/address/data bus as desired.

According to one embodiment, the command/address/data bus lines and the clock line may carry inverted data (i.e. a logical one is represented as a low voltage on the line, and a logical zero is represented as a high voltage). Alternatively, lines may carry non-inverted data (in which a logical one is represented as a high voltage on the line, and logical zero is represented as a low voltage).

Figure 3:
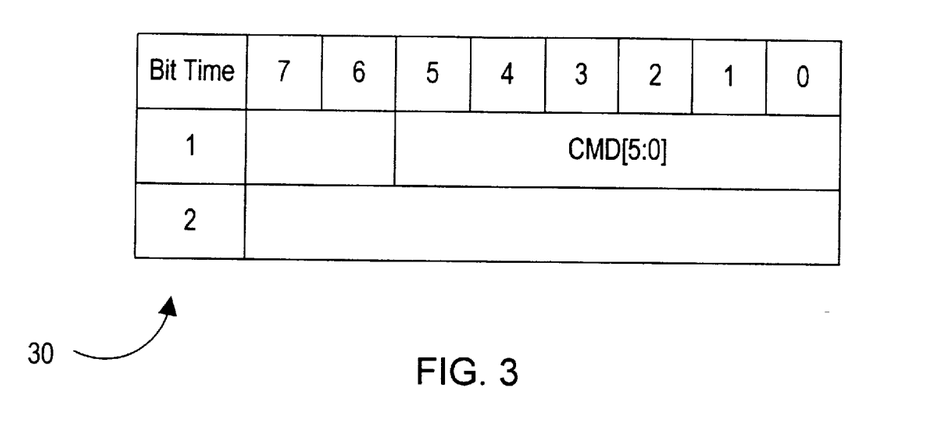
FIG. 3 is a block diagram of one embodiment of a coherent information packet.
Figure 4:
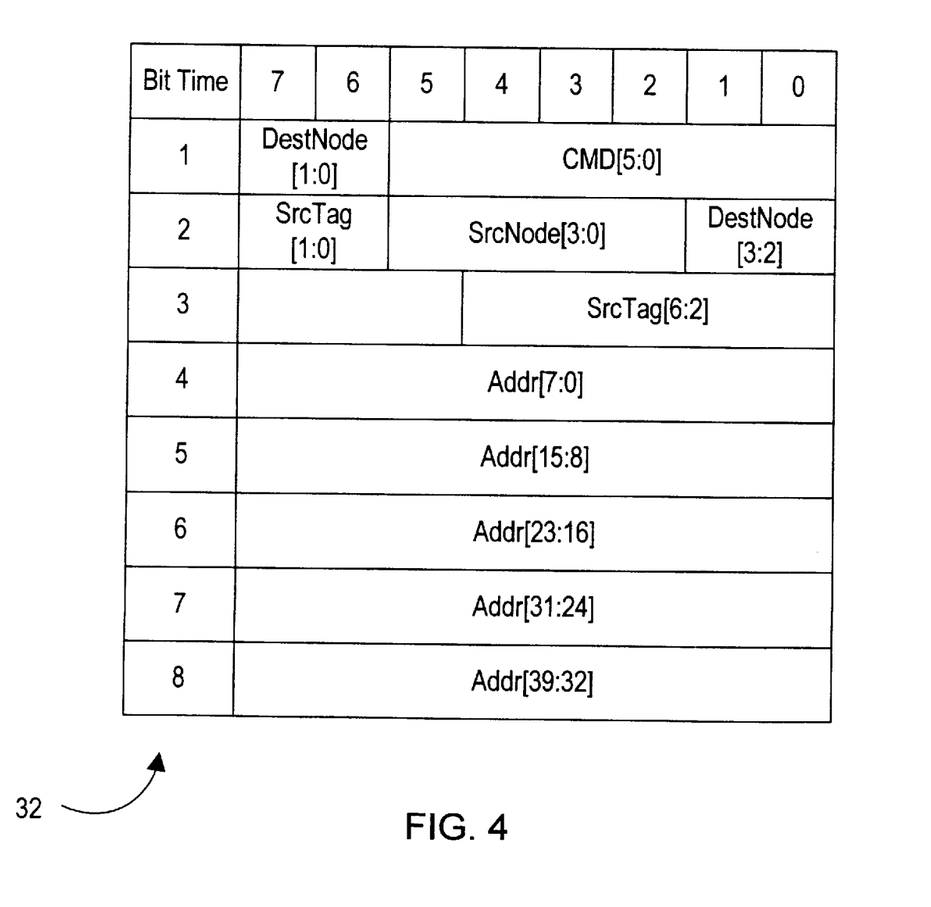
FIG. 4 is a block diagram of one embodiment of a coherent command or address packet.
Figure 5:
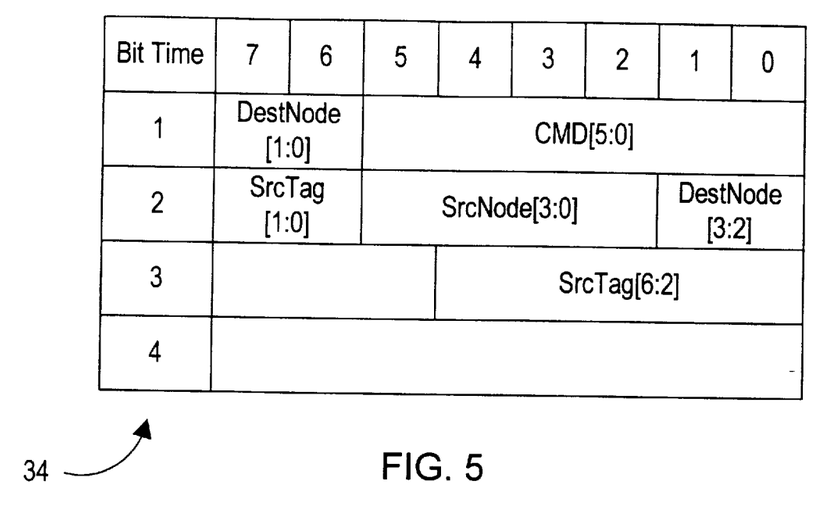
FIG. 5 is a block diagram of one embodiment of a coherent response packet.
Figure 6:
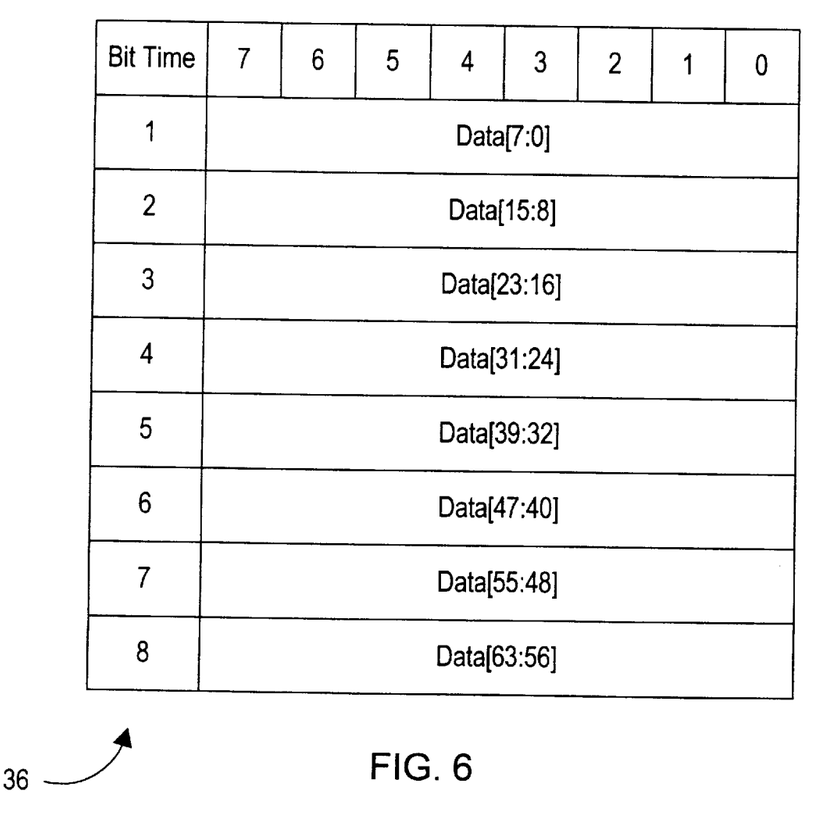
FIG. 6 is a block diagram of one embodiment of a coherent data packet.

Turning now to FIGS. 3–6, exemplary coherent packets employed in coherent transactions according to one embodiment of computer system 10 are shown. FIGS. 3–5 illustrate coherent control packets and FIG. 6 illustrates a coherent data packet. Other embodiments may employ different coherent packet definitions, as desired. Each of the coherent packets are illustrated as a series of bit times enumerated under the "bit time" heading. The bit times of the coherent packet are transmitted according to the bit time order listed. FIGS. 3–6 illustrate coherent packets for an eight bit coherent control/address/data bus implementation. Accordingly, each bit time comprises eight bits numbered seven through zero. Bits for which no value is provided in the figures may either be reserved for a given coherent packet, or may be used to transmit packet-specific information.

FIG. 3 illustrates a coherent information packet (info packet) 30. Coherent info packet 30 comprises two bit times on an eight bit coherent link. A command encoding (CMD [5:0]) may be transmitted during bit time one, and comprises six bits in the present embodiment. Each of the other coherent control packets shown in FIGS. 4 and 5 may include the command encoding in the same bit positions during bit time 1. Coherent info packet 30 may be used to transmit messages between processing nodes when the messages do not include a memory address.

FIG. 4 illustrates a coherent command packet 32. Coherent command packets may also be referred to as coherent address packets. Coherent command packet 32 comprises eight bit times on an eight bit coherent link. The command encoding may be transmitted during bit time 1, along with a portion of a destination node number (DestNode[1:0]). The remainder of the destination node number (DestNode[3:2]) and a source node number (SrcNode[3:0]) may be transmitted during bit time two. A node number (i.e., a destination node number) unambiguously identifies one of the processing nodes 12A–12D within computer system 10, and may be used in routing a coherent packet through computer system 10. Additionally, the source of the coherent packet may be assigned a coherent source tag (SrcTag[6:0]) transmitted during bit times 2 and 3. The coherent source tag may identify coherent packets corresponding to a particular coherent transaction initiated by the source node (i.e. each coherent packet corresponding to a particular coherent transaction includes the same coherent source tag). Bit times four through eight may be used to transmit the memory address affected or targeted by the coherent transaction. Coherent command packet 32 may be used to initiate a coherent memory access transaction (e.g. a coherent read or write transaction).

FIG. 5 illustrates a coherent response packet 34. Coherent response packet 34 may include the command encoding, destination node number, source node number, and coherent source tag similar to the coherent command packet 32. Various types of coherent response packets may include additional information. For example, a coherent read response packet may indicate the amount of read data provided in a following coherent data packet. Coherent probe response packets may indicate whether a hit was detected for the requested cache block. Generally, coherent response packet 34 may be used when addresses are not required to be transmitted. Furthermore, coherent response packet 34 may be used to a transmit positive acknowledgement to terminate a coherent transaction.

FIG. 6 illustrates coherent data packet 36. Coherent data packet 36 may include eight bit times on an eight bit coherent link in the embodiment of FIG. 6. Coherent data packet 36 may comprise different numbers of bit times dependent upon the amount of data being transferred. For example, in one embodiment coherent data packet 36 may comprise a cache block of 64 bytes and hence 64 bit times. Other embodiments may define a cache block to be of a different size, as desired. Additionally, data may be transmitted in less than cache block sizes for non-cacheable reads and writes. Coherent data packets for transmitting data less than cache block size employ fewer bit times.

FIGS. 3–6 illustrate coherent packets for an eight bit coherent link. Packets for 16 and 32 bit coherent links may be formed by concatenating consecutive bit times illustrated in FIGS. 3–6. For example, bit time one of a coherent packet on a 16 bit coherent link may comprise the information transmitted during bit times one and two on the eight coherent bit link. Similarly, bit time one of the coherent packet on a 32 bit coherent link may comprise the information transmitted during bit times one through four on the eight bit coherent link. Formulas 1 and 2 below illustrate the formation of bit time one of a 16 bit coherent link and bit time one of a 32 bit coherent link according to bit times from an eight bit coherent link.

$$BT1_{16}[15:0]=BT2_8[7:0]\|BT1_8[7:0] \quad (1)$$

$$BT1_{32}[31:0]=BT4_8[7:0]\|BT3_8[7:0]\|BT2_8[7:0]\|BT1_8[7:0] \quad (2)$$

Figure 7:
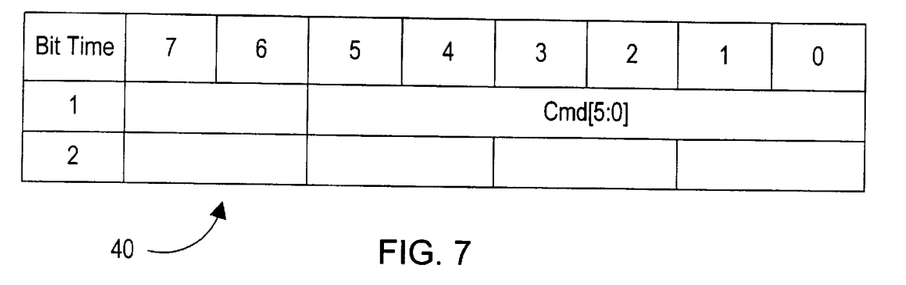
FIG. 7 is a block diagram of one embodiment of a non-coherent information packet.
Figure 8:
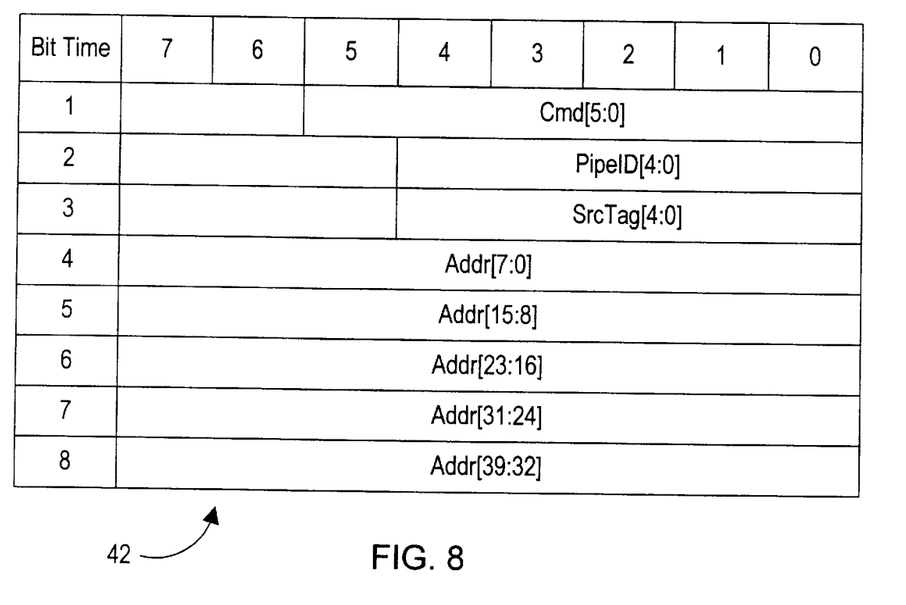
FIG. 8 is a block diagram of one embodiment of a non-coherent address or command packet.
Figure 9:
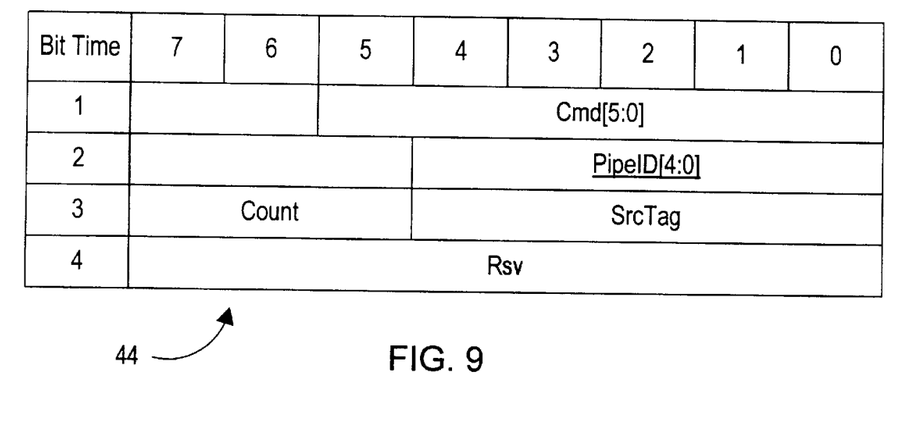
FIG. 9 is a block diagram of one embodiment of a non-coherent response packet.
Figure 10:
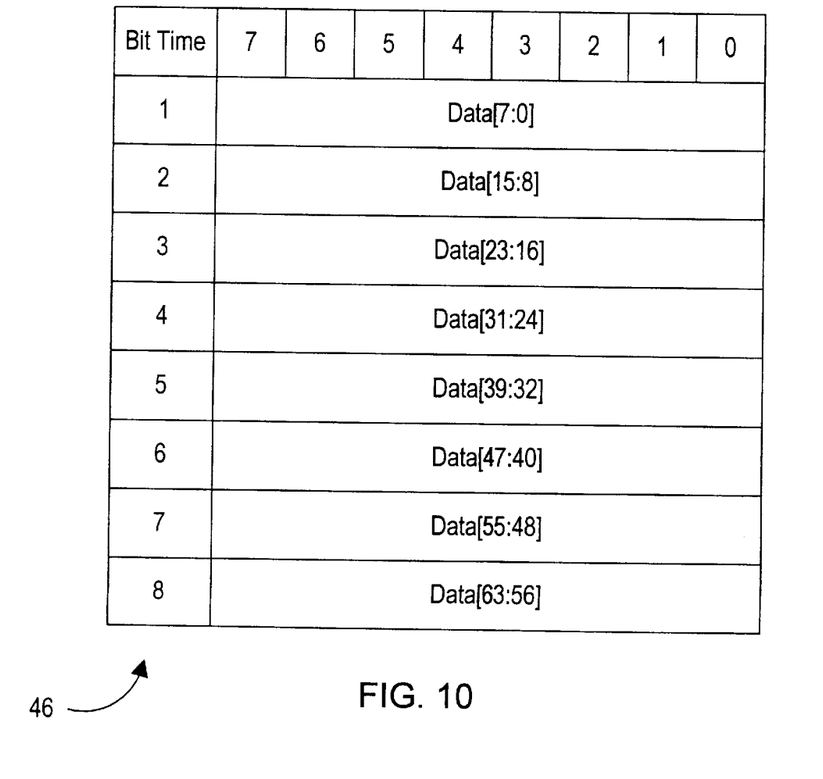
FIG. 10 is a block diagram of one embodiment of a non-coherent data packet.

FIGS. 7–10 illustrate exemplary packets employed in non-coherent transactions (i.e., communication between a processing node and an I/O bridge) according to one embodiment of the of computer system 10 shown in FIG. 1. FIGS. 7–9 illustrate non-coherent control packets and FIG. 10 illustrates a non-coherent data packet. Other embodiments may employ different packet definitions, as desired. Each of the non-coherent packets is illustrated as a series of bit times enumerated under the "bit time" heading. The bit times of the non-coherent packet may be transmitted according to the bit time order listed. FIGS. 7–10 illustrate non-coherent packets for an eight-bit control/address/data bus implementation. Accordingly, each bit time comprises eight bits numbered seven through zero. Bits for which no value is provided in the figures may either be reserved for a given non-coherent packet, or may be used to transmit packet-specific information.

FIG. 7 illustrates a non-coherent information packet (info packet) 40. Non-coherent info packet 40 comprises two bit times on an eight bit non-coherent link. A command encoding (CMD[5:0]) may be transmitted during bit time one, and comprises six bits in the present embodiment. Each of the other non-coherent control packets shown in FIGS. 8 and 9 may include the command encoding in the same bit positions during bit time 1. Non-coherent info packet 40 may be used to transmit messages between a processing node and an I/O bridge when the messages do not include a memory address.

FIG. 8 illustrates a non-coherent command packet 42. Non-coherent command packets may also be referred to as non-coherent address packets. Non-coherent command packet 42 comprises eight bit times on an eight bit non-coherent link. The command encoding of non-coherent packet 42 may be transmitted during bit time 1. A pipe identification (PipeID[4:0]) may be transmitted during bit time two. Non-coherent command packet 42 may include non-coherent source tag (SrcTag[4:0]) transmitted during bit time 3. Bit times four through eight may be used transmit the memory address affected by the non-coherent command packet.

As noted above, an I/O bridge (see e.g., FIG.1) may connect to I/O buses or a graphic device. The I/O buses in turn may connect to one or more I/O devices including a secondary I/O bridge. The secondary I/O bridge, the graphic device, and I/O devices may be examples of "functions." A function is logical entity that may act as a source or destination of, for example, a memory access request. Each function may be distinguished by a unique pipe identification. Non-coherent source tags may be used to distinguish memory access requests corresponding to the same pipe identification. Pipe identifications may allow streams of memory access requests from different functions to be combined onto a non-coherent link between a processing node and an I/O bridge without losing information about the origins (i.e., sources) of the streams.

Non-coherent command packet 42 such as a non-coherent memory access command packet, may be generated by an I/O bridge and transmitted to a host bridge of a processing node in response to a memory access request generated by, for example, an I/O device directly or indirectly coupled to the I/O bridge. I/O bridge transmission of a non-coherent memory access command packet initiates a non-coherent memory access transaction. However, a non-coherent memory access transaction doesn't result in direct access of one of the memories coupled to a processing node. Rather, a non-coherent memory access transaction must first be converted to a coherent memory access transaction. Thus, a non-coherent memory access command packet must be transformed into a coherent memory access command packet which, in turn, initiates a corresponding coherent memory access transaction.

Non-coherent command packet 42, as shown in FIG. 8, is similar to the coherent command packet 32 shown in FIG. 4. However, some differences are important to note. More particularly, the coherent command packet 32 of FIG. 4 does not use the pipe identification or non-coherent source tag of coherent command packet 42 shown in FIG. 8. Rather, the destination node number replaces the pipe identification, and the coherent source tag replaces the non-coherent source tag. When a host bridge receives a non-coherent memory access command packet from an I/O bridge, the host bridge transforms the received non-coherent memory access command packet into a coherent memory access command packet for transmission on a coherent link. Non-coherent memory access transactions initiated with non-coherent memory access command packets 42 having the same pipe identification, are often required to complete in order. The transformed non-coherent memory access command packet, however, no longer contains a pipe identification nor a non-coherent source tag. Without a pipe identification in the transformed non-coherent memory access command packet, transformed non-coherent memory access command packets might be erroneously processed and completed out of order by the processing nodes.

FIG. 9 illustrates one embodiment of non-coherent response packet 44. Non-coherent response packet 44 may include the command encoding, pipe identification, and non-coherent source tag similar to the non-coherent command packet 42. Various types of non-coherent response packets may include additional information. For example, a non-coherent read response packet may include a Count to indicate the amount of data provided in a following non-coherent data packet. Unlike coherent transactions, non-coherent transactions do not employ probes nor probe responses, commands which will be further explained below. Generally, non-coherent response packet 44 may be used when addresses are not required to be transmitted. Furthermore, non-coherent response packet 44 may be used to transmit a positive acknowledgement to terminate a non-coherent transaction.

FIG. 10 illustrates the non-coherent data packet 46. Non-coherent data packet 36 may include eight bit times on an eight bit non-coherent link in the embodiment of FIG. 10. Non-coherent data packet 46 may comprise different numbers of bit times dependent upon the amount of data being transferred.

FIGS. 7–10 illustrate non-coherent packets for an eight bit non-coherent link. Packets for 16 and 32 bit non-coherent links may be formed by concatenating consecutive bit times illustrated in FIGS. 7–10. For example, bit time one of a non-coherent packet on a 16 bit non-coherent link may comprise the information transmitted during bit times one and two on the eight non-coherent bit link. Similarly, bit time one of the non-coherent packet on a 32 bit coherent link may comprise the information transmitted during bit times one through four on the eight bit non-coherent link. Formulas 3 and 4 below illustrate the formation of bit time one of a 16 bit non-coherent link and bit time one of a 32 bit non-coherent link according to bit times from an eight bit non-coherent link.

$$BT1_{16}[15:0]=BT2_8[7:0]\|BT1_8[7:0] \quad (3)$$

$$BT1_{32}[31:0]=BT4_8[7:0]\|BT3_8[7:0]\|BT2_8[7:0]\|BT1_8[7:0] \quad (4)$$

Figure 11:
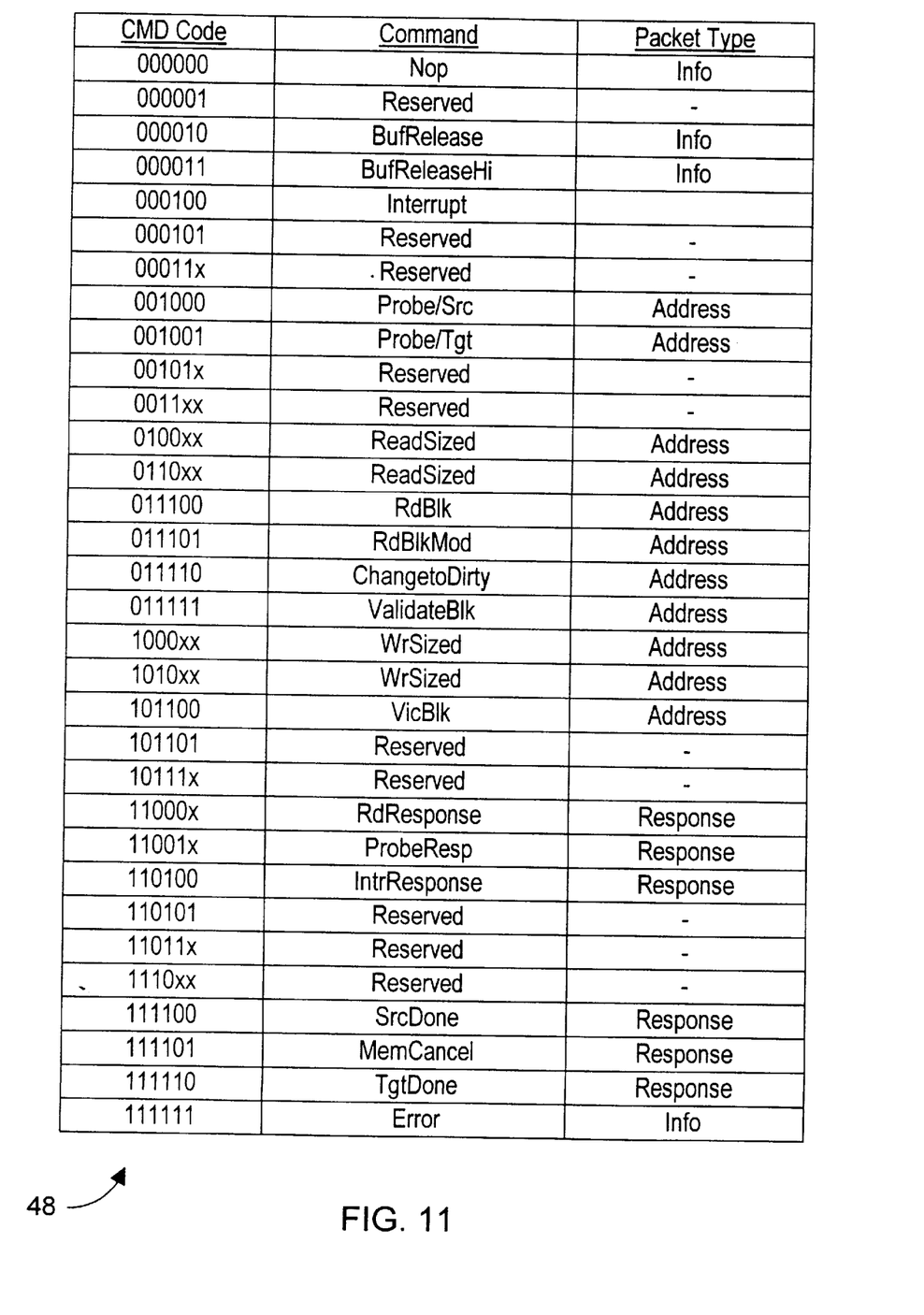
FIG. 11 is a table illustrating exemplary packet types.

Turning now to FIG. 11, a table 48 is shown illustrating commands employed in transmitted coherent or non-coherent packets according to one exemplary embodiment of the computer system 10. Other embodiments are possible and contemplated. Table 48 includes a command code column illustrating the command encoding assigned to each command, a command column naming the command, and a packet type column indicating which packet is employed for that command.

A coherent memory read transaction might be initiated by transmitting a coherent command packet containing one of the ReadSized, RdBlk, RdBlkS or RdBlkMod commands. The ReadSized command may be used for non-cacheable reads or reads of data other than a cache block in size. The amount of data to be read may be encoded into the coherent ReadSized command packet. For reads of a cache block, the RdBlk command may be used unless: (i) a writeable copy of the cache block is desired, in which case the RdBlkMod command may be used; or (ii) a copy of the cache block is desired but no intention to modify the block is known. The RdBlkS command may be used to make certain types of coherency schemes (e.g. directory based coherency schemes) more efficient.

In general, the appropriate read command may be transmitted in a coherent command packet from a source node initiating the memory access transaction to a destination node coupled to the memory which owns the requested read data. The memory controller in the destination node may broadcast a Probe/Src command in coherent command packets to the other nodes in the system to maintain coherency by changing the state of the read data if in those nodes and by causing a node including an updated copy of the cache block to send the read data to the source node. Each node receiving a Probe/Src may transmit a coherent response packet containing a ProbeResp command to the source node.

If a probed node has an updated copy of the read data (i.e. dirty data), that node may transmit a RdResponse command in a coherent command packet and the dirty data in a subsequent coherent data packet. A node transmitting dirty data may also transmit a MemCancel command in a coherent response packet to the destination node in an attempt to cancel transmission by the destination node of the requested read data. Additionally, the memory controller in the destination node may transmit the requested read data using a RdResponse command in a coherent command packet followed by the data in a coherent data packet. If the source node receives a RdResponse command from a probed node, the associated read data is used. Otherwise, the data from the destination node is used.

Once each of the coherent response packets and the read data is received in the source node, the source node transmits a coherent SrcDone response packet to the destination node as a positive acknowledgement of the termination of the coherent memory read transaction.

A coherent memory write transaction may be initiated by transmitting a coherent WrSized or VicBlk command packet followed by a corresponding coherent data packet. The coherent WrSized command packet may be used for non-cacheable writes or writes of data other than a cache block in size. To maintain coherency for WrSized commands, the memory controller in the destination node may broadcast a coherent Probe/Tgt command packet to each of the other nodes in the system. In response, each probed node may transmit a ProbeResp response packet to the destination node. If a probed node is storing dirty data, the probed node may respond with a RdResponse packet, and the dirty data is subsequently transmitted in a coherent data packet. In this manner, a cache block updated by the WrSized command is returned to the memory controller for merging with the data provided with the WrSized command. The memory controller, upon receiving coherent probe response packets from each of the probed nodes, may transmit a TgtDone command in a coherent response packet to the source node to provide a positive acknowledgement of the termination of the coherent memory write transaction. The source node may reply with a SrcDone command in a coherent response packet.

A victim cache block that has been modified by a node and is being replaced in a cache within the node may be transmitted back to memory using the coherent VicBlk command packet. Probes are not needed for the coherent VicBlk command packet. Accordingly, when the destination memory controller is prepared to commit victim block data, the destination memory controller may transmit a TgtDone packet in a coherent response packet to the source node of the victim block. The source node may reply with either a SrcDone in a coherent response packet to indicate that the data should be committed or a MemCancel in a coherent response packet to indicate that the data has been invalidated between transmission of the coherent VicBlk command packet and receipt of the TgtDone response packet (e.g. in response to an intervening probe).

The coherent ChangetoDirty command packet may be transmitted by a source node in order to obtain write permission for a cache block stored by the source node in a non-writeable state. A transaction initiated with a coherent ChangetoDirty command packet may operate similar to a read except that the destination node does not return data. The coherent ValidateBlk command packet may be used to obtain write permission to a cache block not stored by a source node if the source node intends to update the entire cache block. No data is transferred to the source node for such a transaction, but otherwise operates similar to a coherent memory read transaction.

The coherent Interrupt Broadcast (Intr/Brd), Interrupt Target (Int/Tgt), and IntrResponse packets may be used to broadcast interrupts, to send an interrupt to a particular destination node, and to respond to interrupts, respectively. The coherent CleanVicBlk command packet may be used to inform a memory controller that a clean victim block has been discarded from a node (e.g. for directory based coherency schemes). The coherent TgtStart command packet may be used by a destination node to indicate that a first coherent transaction has been started and is complete to the extent necessary for a subsequent coherent transaction to begin without violating transaction ordering. The TgtStart command packet is useful in situations when initiation of the subsequent is dependent upon completion of the first transaction. The TgtStart command packet enables early initiation of the subsequent coherent transaction which otherwise would have been delayed until completion of the first coherent transaction. The Error command is used to transmit an error indication.

Non-coherent transactions use many of the same commands of FIG. 11 as the coherent transactions. With reference to FIG. 1, non-coherent memory access transactions may begin with a memory access request generated by one of the I/O devices 28 or graphic device 26 connected directly or indirectly to an I/O bridge 20. The received I/O device requests may be transformed into non-coherent memory access transactions by the I/O bridge 20, and the subsequent non-coherent memory access transactions are transmitted via non-coherent link to a connecting host bridge (not shown in FIG. 1). For example, the I/O bridge 20 may generate a non-coherent command packet containing a ReadSized command in response to receiving a memory read request from a coupled I/O device 28. The non-coherent ReadSized command packet, including the memory address of the memory read request, is then transmitted over the non-coherent link to the host bridge connected thereto. The host bridge in turn may start a coherent memory read transaction by transforming the non-coherent ReadSized command packet into a coherent ReadSized command packet and transmitting the resulting coherent ReadSized command packet to the destination node that owns the memory address where the requested data is stored. Thereafter, the coherent memory read transaction proceeds as described above, and a coherent RdResponse packet and a subsequent coherent data packet may be returned to the source node containing the host bridge. The host bridge in turn may transform the received coherent RdResponse and data packets into non-coherent RdResponse and data packets, and transmit the non-coherent RdResponse and data packets over the non-coherent link to the 1/O bridge connected thereto. The I/O bridge may then route the read data to the source I/O device 28 requesting the read data.

A non-coherent memory write transaction may be initiated by the I/O bridge in response to receiving a write memory request from an I/O device coupled directly or indirectly thereto. For example, the I/O bridge may generate a non-coherent command packet containing a WrSized command in response to receiving memory write request from a coupled I/O device. The non-coherent WrSized command packet, including the memory address of the memory write request, may then be transmitted over the non-coherent link to the host bridge connected thereto. The host bridge in turn may start a coherent memory write transaction by transforming the non-coherent WrSized command packet into a coherent WrSized command packet and transmitting the coherent WrSized command packet to the destination node that owns the memory address where the requested data, which follows in a coherent data packet, is to be written. The destination node may proceed as described above and send a coherent TgtDone response packet back to the source node containing the host bridge. Optionally, the host bridge may in turn generate a non-coherent TgtDone response packet for transmission to the I/O bridge.

When a non-coherent memory access transaction is initiated by the I/O bridge, the host bridge may respond by starting a new coherent memory access transaction. This includes, for example, the host bridge replacing the pipe identification and the non-coherent source tag in the non-coherent ReadSized or WrSized command packet with the appropriate destination node number and coherent source tag, respectively, in addition to placing the source node number into the source node field. As noted earlier, non-coherent memory access transactions having the same pipe identification may be required to complete in order. However, if the coherent memory access transactions representing transformed non-coherent memory access transactions lack pipe identifications, the coherent memory access transactions representing transformed non-coherent memory access transactions might complete out of order and create erroneous results. Therefore, if a new coherent memory access transaction corresponding to a non-coherent memory access transaction, is started, and if the pipe that initiated the non-coherent memory access transaction has another ordered corresponding coherent memory access transaction in progress, the host bridge must stall the new coherent memory access transaction until all in progress ordered coherent memory transactions corresponding to the same pipe, but to different nodes, are complete. It is noted that the host bridge need not stall a new coherent memory access transaction if all in progress ordered coherent memory transactions corresponding to the same pipe are also directed to the same node since the coherent memory access transactions may have an ordering bit which, when set, requires the destination node to process memory accesses in order received. Alternatively, order between coherent transactions directed to the same node and which correspond to the same pipe, may still be maintained without the above mentioned ordering bit. In this embodiment, the node to which is directed transactions corresponding to the same pipe, can maintain order based on command type. For example, transactions corresponding to the same pipe received by the common node are stored in a particular buffer based on command type, wherein the transactions stored in the buffer are processed on a first in first out basis. Further, a particular pipe identification may be designated as a "don't care" to identify non-coherent transactions which may be completed out of order with respect to transactions having the same "don't care" pipe identification.

Figure 12:
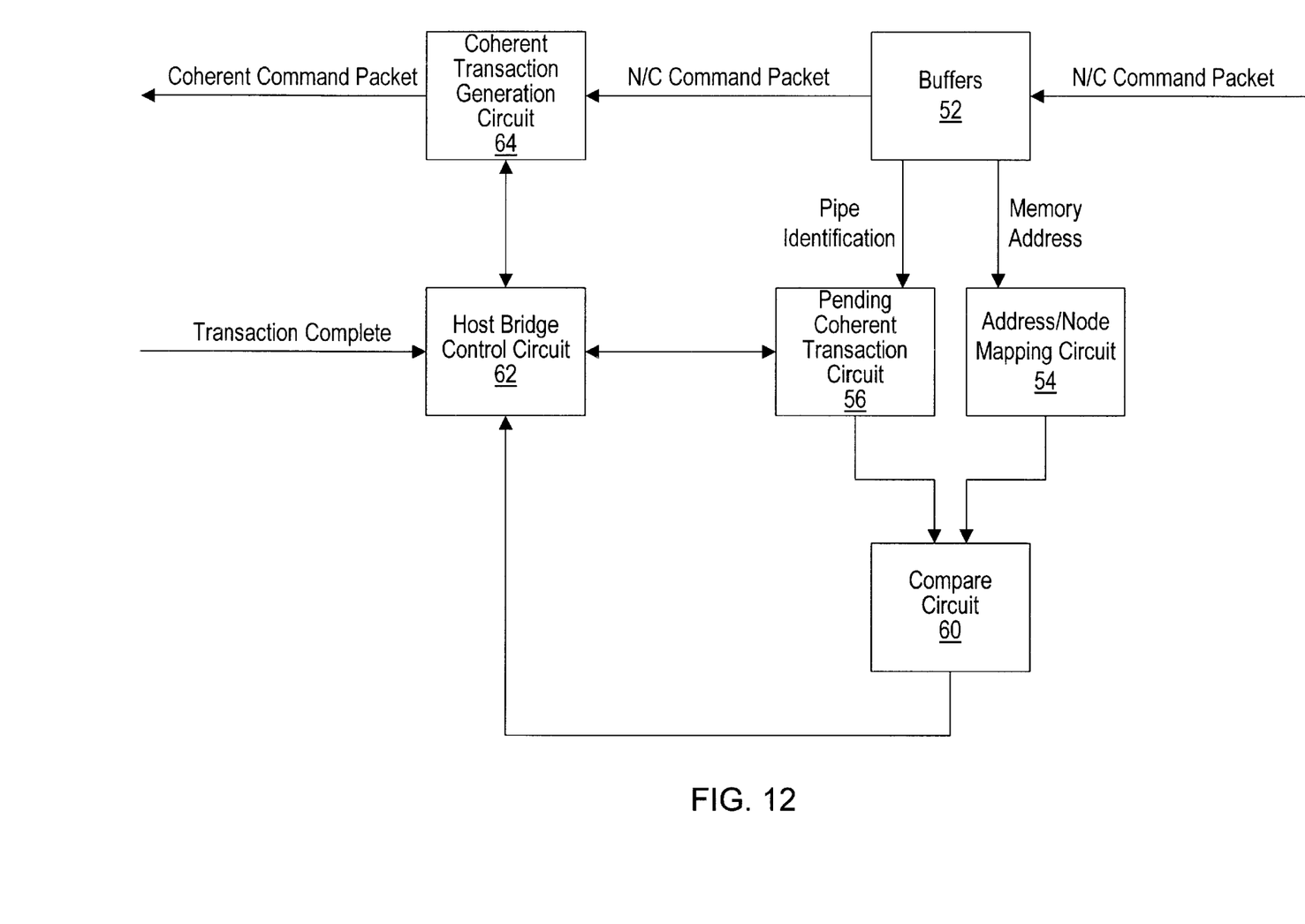
FIG. 12 is a block diagram of the processing node of FIG. 1 coupled to the I/O bridge.

With reference to FIGS. 1 and 12, one embodiment of host bridge circuit (host bridge) 50 mentioned above will be described in greater detail. Other embodiments of the host bridge 50 are contemplated. Host bridge 50 may include non-coherent transaction buffers 52 for receiving non-coherent packets from I/O bridge 20, an address/node map circuit 54 for mapping memory addresses to processor nodes, a pending coherent transaction circuit 56 which stores pipe identification/destination node number pairs corresponding to pending coherent memory access transactions wherein the pending coherent memory access transactions represent transformed non-coherent memory access transactions that are currently pending within system 10, compare circuit 60 for comparing destination node numbers from pending coherent transaction circuit 56 to node numbers from the address/node mapping circuit 54, host bridge control circuit 62, and coherent transaction packet generator circuit 64.

Transaction packet buffers 52 optionally may be included in interface node 18L and may receive non-coherent packets from I/O bridge circuit 20 if the buffers have sufficient space. Non-coherent info packets may be used to control flow of non-coherent packets to buffers 52 when one or more buffers lack space to receive non-coherent packets. Address/node mapping circuit 54, coherent transaction packet generator 64, and pending coherent transaction circuit 56 are coupled to one or more buffers of the non-coherent transaction packet buffers 52. Host bridge control circuit 62 may control pending coherent transaction circuit 56 and coherent packet generator circuit 64.

One of the buffers of non-coherent transaction buffers 52 may receive non-coherent command packets for reading or writing data to one of the memories 14 coupled to processing nodes 12. After a non-coherent command packet is received in one of the buffers of buffers 52, the memory address and pipe identification contained therein may be extracted. The extracted memory address may then be provided to address/node map circuit 54, and the extracted pipe identification may be provided to pending coherent transaction circuit 56. Address/node map circuit 54 may map the extracted memory address to the node number of a processing node 12 that owns the extracted memory address. The mapped node number may then be outputted to compare circuit 60. Pending coherent transaction circuit 56 may check the pipe identification/destination node number pairs stored therein against the extracted pipe identification to determine whether a coherent memory transaction associated with the same pipe identification, is pending. If a match occurs between the extracted pipe identification and the pipe identification of a pending coherent memory transaction, circuit 54 may output the destination node number corresponding to that pending memory transaction. The outputted destination node number might be provided to compare circuit 60 for comparison with the node number outputted from the address/node map circuit 54.

If the destination node number and the node number outputted by pending coherent transaction circuit 56 and address/node map circuit 54, respectively, compare equally, then coherent transaction packet generator 64 may generate a coherent memory access command packet from the contents of the received non-coherent memory access command packet. Except for the pipe identification and non-coherent source tag, the generated coherent memory access command may contain substantially the same info as the non-coherent memory access transaction. The generated coherent memory access command packet may then be transmitted from node 12D to start a corresponding coherent memory access transaction. Control circuit 62 may update pending coherent transactions circuit 56 with a pipe identification/destination node pair when the coherent memory access command packet is transmitted.

Pending coherent transaction circuit 56 is configured to sense pipe identifications which are designated "don't care" as described above. In the event that the pipe identification extracted from the non-coherent memory access transaction received in buffer 52 is a "don't care" designated pipe identification, then pending coherent transaction circuit 56 signals host bridge control accordingly. Host bridge control circuit 62 in turn directs coherent transaction generation circuit 64 to generate and transmit a corresponding coherent transaction. Thus, a corresponding coherent transaction is generated and transmitted upon buffer 52 receiving a non-coherent memory transaction with a "don't care" pipe identification without checking the "don't care" pipe identification against the pipe identifications of pending coherent transactions.

If the destination node number and the node number outputted by pending coherent transaction circuit 56 and address/node map circuit 54, respectively, do not compare equally, then coherent transaction packet generator 64 may stall generation of coherent memory access command packet until such time when pending coherent transaction circuit 56 lacks a pipe identification which matches the extracted pipe identification. The stall may end when the transaction corresponding to the pipe identification/destination node pair causing the stall, is deleted or other wise invalidated by the host bridge control circuit 62 in response to completion of the coherent memory transaction corresponding to the pipe identification/destination node pair causing the stall or in response to receiving a TgtStart response from the processing node to which the coherent memory transaction corresponding to the pipe identification/destination node pair causing the stall.

Figure 13:
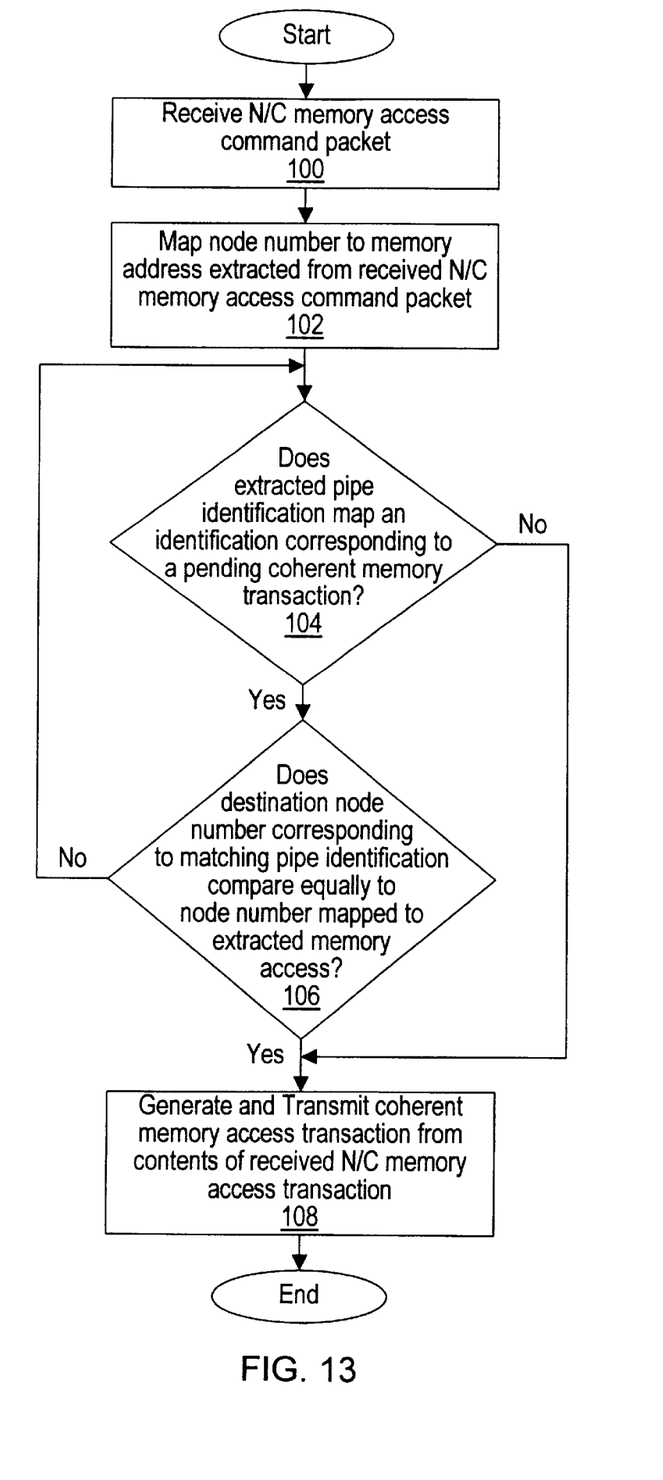
FIG. 13 is a flow chart illustrating operational aspects of the processing node shown in FIG. 12.

Turning now to FIG. 13, a more detailed explanation regarding operation of the host bridge 50 shown in FIG. 12 is described. More particularly, FIG. 13 shows a flow chart illustrating operational aspects of the host bridge 50 shown in FIG. 12. In step 100, the host bridge 40 may receive a non-coherent memory access command packet from I/O bridge 20 (not shown in FIG. 10). The received non-coherent packet is stored in one of the buffers of buffers 52 if space is available therein.

In step 102, a node number mapped to the memory address extracted from the received non-coherent command packet may be read from address/node map circuit 54. In step 104 pending coherent transaction circuit 64 may be accessed with the extracted pipe identification of the received non-coherent memory access command packet, and pending transaction circuit 64 may be searched using the extracted pipe identification to determine whether a match exists therein. If a match does not exist, the process may proceed to step 108 wherein a coherent memory access command packet corresponding to the received non-coherent memory access command packet, is generated and transmitted to an appropriate destination node. However, if a match does exist within pending transaction circuit 74, the process may proceed to step 106 where the destination node number corresponding to the matched pipe identification is compared against the node number output from address/node map circuit 54. If the node number does not match the destination number, the process may stall by returning to step 104. If the node and destination numbers compare equally, then in step 108, coherent memory access command packet corresponding to the received non-coherent memory access command packet, may be generated and transmitted to an appropriate destination node. Once the coherent memory access command packet is generated and transmitted, control circuit 62 may update the pending transaction circuit 56 by storing therein the pipe identification and destination node number of the transmitted coherent memory access command packet.

As noted above in step 106, if the node numbers compare unequally, the process may stall. This stall may continue until control circuit 62 deletes or otherwise invalidates the pending transaction circuit 56 stored entry which prohibits the coherent command packet generation and transmission corresponding to the received non-coherent packet. This is typically done with the coherent memory access transaction corresponding to the entry stored in circuit 56, has been completed.

While the present invention has been described with reference to particular embodiments, it will be understood that the embodiments are illustrated and that the invention scope is not so limited. Any variations, modifications, additions and improvements to the embodiments described are possible. These variations, modifications, additions and improvements may fall within the scope of the invention as detailed within the following claims.

What is claimed is:

1. A method of operating a multiprocessor computer system comprising a plurality of circuit nodes and a plurality of memories, wherein each circuit node comprises at least one microprocessor coupled to a memory controller, wherein each memory controller is coupled to one of the plurality of memories, wherein the plurality of circuit nodes are in data communication with each other, wherein each circuit node is uniquely identified by a node number, wherein one of the circuit nodes is coupled to an I/O bridge, wherein the I/O bridge is configured to generate and transmit a non-coherent memory access transaction, wherein the one of the circuit nodes is configured to receive the non-coherent memory access transaction, wherein the one of the circuit nodes is configured to transform the non-coherent memory access transaction into a coherent memory access transaction, and wherein each non-coherent memory access transaction comprises at least one command packet containing a pipe identification and a memory address, the method comprising:

generating a first non-coherent memory access transaction, wherein the first non-coherent memory access transaction comprises a first memory address and a first pipe identification;

generating a second non-coherent memory access transaction after generating the first non-coherent memory access transaction, wherein the second non-coherent memory access transaction comprises a second memory address and a second pipe identification;

mapping the first and second memory addresses to first and second node numbers, respectively;

comparing the first and second pipe identifications;

comparing the first and second node numbers if the first and second pipe identifications compare equally;

generating a first coherent memory access transaction corresponding to the first non-coherent memory access transaction;

generating a second coherent memory access transaction corresponding to the second non-coherent memory access transaction if the first and second pipe identifications do not compare equally or if the first and second node numbers compare equally.

2. The method of claim 1 wherein each pipe identification corresponds to non-coherent memory access transactions which must complete in order such that all non-coherent memory access transactions comprising the first pipe identification must complete in order and all non-coherent memory access transactions comprising the second pipe identification must complete in order.

3. The method of claim 1 wherein each coherent memory access transaction comprises reading or writing data to one of the plurality of memories.

4. The method of claim 1 wherein each coherent memory access transaction comprises reading or writing data to one of the plurality of memories, wherein the data read or written to one of the plurality of memories passes through the I/O bridge circuit.

5. The method of claim 1 further comprising:
storing the first pipe identification and the first node number as a first pair in a memory contained the one of the plurality of circuit nodes in response to generating the first coherent memory access transaction, and;
invalidating the first pair after completing the first coherent memory access transaction.

6. A method of operating a multiprocessor computer system comprising a plurality of circuit nodes and a plurality of memories, wherein each circuit node comprises at least one microprocessor coupled to a memory controller, wherein each memory controller is coupled to one of the plurality of memories, wherein adjacent circuit nodes are connected via a coherent link, wherein each circuit node is assigned a unique node number, wherein one of the circuit nodes is coupled to an I/O bridge via a non-coherent link, wherein the I/O bridge is configured to generate and transmit a non-coherent memory access packet via the non-coherent link to the one of the circuit nodes, wherein the one of the circuit nodes is configured to transform the non-coherent memory access packet into a coherent memory access packet, wherein the one of the circuit nodes is configured to transmit the coherent memory access packets to another of the circuit nodes, wherein the non-coherent memory access packet comprises a pipe identification and a memory address, and wherein the coherent memory access packet comprises one of the node numbers and the memory address, the method comprising:
generating a first non-coherent memory access packet, wherein the first non-coherent memory access packet comprises a first memory address and a first pipe identification;
generating a second non-coherent memory access packet after generating the first non-coherent memory access packet, wherein the second non-coherent memory access packet comprises a second memory address and a second pipe identification;
mapping the first and second memory addresses to first and second node numbers, respectively;
comparing the first and second pipe identifications;
comparing the first and second node numbers if the first and second pipe identifications compare equally;
generating a first coherent memory access packet corresponding to the first non-coherent memory access packet;
generating a second coherent memory access packet corresponding to the second non-coherent memory access packet;
transmitting the first coherent memory access packet, and;
transmitting the second coherent memory access packet if the first and second pipe identifications do not compare equally or if the first and second node numbers compare equally.

7. The method of claim 6 wherein the first coherent memory access packet comprises the first node number and the first memory address, and wherein the second coherent memory access packet comprises the second node number and the second memory address.

8. The method of claim 6 wherein each pipe identification corresponds to memory accesses requests generated by one I/O device coupled to the I/O bridge.

9. The method of claim 6 wherein each pipe identification corresponds to memory accesses requests transmitted over one I/O bus coupled to the I/O bridge.

10. A multiprocessor computer system comprising:
a plurality of node circuits each one of which comprises at least one microprocessor in data communication with a memory controller, wherein each node circuit is uniquely identified by a node number, and wherein the plurality of node circuits are in data communication with each other;
a plurality of memories each one of which is in data communication with one of the memory controllers;
an input/output (I/O) bridge circuit in data communication with a first node circuit, wherein the I/O bridge circuit is configured to sequentially generate first and second non-coherent command packets, wherein the first non-coherent command packet contains a first pipe identification and a first memory address, and wherein the second non-coherent command packet contains a second pipe identification and a second memory address;
wherein the first node circuit is configured to receive the first and second non-coherent command packets, wherein the first node circuit further includes a memory circuit for mapping the first and second memory addresses of the received first and non-coherent second command packets to first and second node numbers, respectively, wherein the first node circuit comprises a node number compare circuit for comparing the first and second node numbers, and wherein the first node circuit comprises a pipe identification compare circuit for comparing the first and second pipe identifications;
wherein the first node circuit is configured to generate first and second coherent command packets corresponding to the received first and second non-coherent command packets, wherein the first node circuit is configured to transmit the first coherent command packet, and wherein the first node circuit is configured to transmit the second coherent command packet if the first and second pipe identifications do not compare equally or if the first and second node numbers compare equally.

11. The multiprocessor computer system of claim 10 wherein the first and second non-coherent command packets includes a command to read or write data to one of the plurality of memories.

12. The multiprocessor computer system of claim 11 wherein the first and second coherent command packets includes the command to read or write data to one of the plurality of memories.

13. The multiprocessor computer system of claim 12 wherein the first and second coherent command packets includes the first and second node numbers, respectively.

14. A multiprocessor computer system comprising:
a plurality of node circuits each one of which comprises at least one microprocessor in data communication with a memory controller, wherein each node circuit is uniquely identified by a node number;
a plurality of memories each one of which is in data communication with one of the memory controllers;
a plurality of coherent links for transmitting coherent memory access transactions between node circuits, wherein each coherent link connects a pair of node circuits;
an input/output (I/O) bridge circuit;
a non-coherent link for transmitting non-coherent memory access transactions between the I/O bridge and a first node circuit, wherein the I/O bridge circuit is configured to sequentially generate first and second non-coherent memory access transactions, wherein the first non-coherent memory access transaction contains a first pipe identification and a first memory address, and wherein the second non-coherent memory access transaction contains a second pipe identification and a second memory address;

wherein the first node circuit is configured to receive the first and second non-coherent memory access transactions, wherein the first node circuit further includes a first memory circuit for mapping the first and second memory addresses of the received first and non-coherent second memory access transactions to first and second node numbers, respectively, wherein the first node circuit comprises a node number compare circuit for comparing the first and second node numbers, and wherein the first node circuit comprises a pipe identification compare circuit for comparing the first and second pipe identifications;

wherein the first node circuit is configured to generate a first coherent memory access transaction corresponding to the received first non-coherent memory access transaction, and wherein the first node circuit is configured to generate a second coherent memory access transaction corresponding to the received second non-coherent memory access transaction if the first and second pipe identifications do not compare equally or if the first and second node numbers compare equally.

15. The multiprocessor computer system of claim 14 wherein each pipe identification corresponds to non-coherent memory access transactions which must complete in order such that all non-coherent memory access transactions comprising the first pipe identification must complete in order and all non-coherent memory access transactions comprising the second pipe identification must complete in order.

16. The multiprocessor computer system of claim 14 wherein each coherent memory access transaction comprises reading or writing data to one of the plurality of memories.

17. The multiprocessor computer system of claim 14 wherein each coherent memory access transaction comprises reading or writing data to one of the plurality of memories, wherein the data read or written to one of the plurality of memories passes through the I/O bridge circuit.

18. The multiprocessor computer system of claim 14 wherein the first circuit node further comprises a second memory circuit for storing the first pipe identification and the first node number as a first pair.

* * * * *